United States Patent
Qian et al.

(10) Patent No.: US 10,114,456 B2
(45) Date of Patent: Oct. 30, 2018

(54) SIGHT TRACKING METHOD AND DEVICE

(71) Applicant: BOE TECHNOLOGY GROUP CO., LTD., Beijing (CN)

(72) Inventors: Chenfei Qian, Bejing (CN); Kening Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 119 days.

(21) Appl. No.: 15/165,724

(22) Filed: May 26, 2016

(65) Prior Publication Data

US 2017/0031437 A1    Feb. 2, 2017

(30) Foreign Application Priority Data

Jul. 30, 2015   (CN) .......................... 2015 1 0458572

(51) Int. Cl.
G06K 9/00       (2006.01)
G06F 3/01       (2006.01)
G06T 7/277      (2017.01)
G06F 3/00       (2006.01)

(52) U.S. Cl.
CPC .............. G06F 3/013 (2013.01); G06F 3/005 (2013.01); G06T 7/277 (2017.01); G06K 9/00597 (2013.01); G06T 2207/20084 (2013.01); G06T 2207/30201 (2013.01)

(58) Field of Classification Search
CPC ..... G06F 3/005; G06F 3/013; G06K 9/00597; G06T 2207/20084; G06T 2207/30201; G06T 7/277
See application file for complete search history.

(56) References Cited

U.S. PATENT DOCUMENTS

2004/0174496 A1* 9/2004 Ji ............................ G06F 3/013
                                                     351/209
2016/0005176 A1* 1/2016 Nguyen ................ G06F 3/013
                                                     382/103

* cited by examiner

Primary Examiner — Siamak Harandi
(74) Attorney, Agent, or Firm — Collard & Roe, P.C.

(57) ABSTRACT

Embodiments of the present disclosure relate to a sight tracking method and a device, the sight tracking method comprises: determining an observation region where an iris center of a to-be-tested iris image is located according to a target model; modifying a prediction region by using the observation region, to obtain a target region, the prediction region being a region where the iris center of the to-be-tested iris image is located determined by a kalman filtering method; and determining a position of fixation point of human eyes on a screen according to the target region.

13 Claims, 9 Drawing Sheets

SIGHT TRACKING METHOD AND DEVICE

CROSS REFERENCE TO RELATED APPLICATIONS

Applicant claims priority under 35 U.S.C. § 119 of Chinese Application No. 201510458572.9 filed on Jul. 30, 2015, the disclosure of which is incorporated by reference.

TECHNICAL FIELD

Embodiments of the present disclosure relate to a sight tracking method and a device.

BACKGROUND

Human-computer interaction is a technology which studies a human and a computer as well as their interaction, and by a human-computer interaction technology, communication between the human and the computer may be implemented by using all possible information channels. With rapid development of an electronic technology, the human-computer interaction technology is widely used in interaction between the human and a television; a function of the television is more and more powerful, design of a remote controller is more and more complicated; if human-computer interaction is implemented by operating the remote controller, time for interaction will become longer, and efficiency of interaction is lowered; and thus, a human-computer interaction method based on sight tracking attracts extensive attention. Sight tracking is a technology of obtaining a "gazing direction" of a user by various detection means such as mechanics, electronics, and optics.

In a related art, the human-computer interaction method based on sight tracking mainly tracks sight according to a kalman filtering method, to complete a human-computer interaction procedure. What is used in the kalman filtering method is a recursive technology, in which it is believed that a state at current moment is only dependent on a state at previous moment, and is not dependent on states of all moments. Exemplarily, firstly, an acquired facial image is processed, to obtain a potential region of human eyes; next, feature information of a structure of the human eyes, e.g., an iris, is obtained; then a prediction region where an iris center is located at (k+1)th moment is determined according to a region where the iris center is located at kth moment and a state equation by using the kalman filtering method, an observation region where the iris center is located at the (k+1)th moment is determined according to an observation equation and the prediction region where the iris center is located at the (k+1)th moment; then the prediction region where the iris center is located at the (k+1)th moment is modified by using the observation region where the iris center is located at the (k+1)th moment, to obtain an optimal estimation region of the iris center; and finally, a sight direction of the human eyes is determined according to the optimal estimation region of the iris center, to further determine a position of fixation point of human eyes on a screen, and complete the human-computer interaction procedure.

Because in the above process, the human eyes are constantly moving and changing, and the state equation for determining the prediction region where the iris center is located is a linear equation, an accuracy of the prediction region is lower, correspondingly, an accuracy of the observation region for modifying the prediction region is lower, and it is of a lower precision and a lower speed to finally determine the position of fixation point of human eyes on a screen.

SUMMARY

Embodiments of the present disclosure relate to a sight tracking method and a device, which can solve issues of lower precision and a lower speed when determining the position of fixation point of human eyes on a screen.

In one aspect, an embodiment of the present disclosure provides a sight tracking method, comprising: determining an observation region where an iris center of a to-be-tested iris image is located according to a target model; modifying a prediction region by using the observation region, to obtain a target region, the prediction region being a region where the iris center of the to-be-tested iris image is located determined by a kalman filtering method; and determining a position of fixation point of human eyes on a screen according to the target region.

In another aspect, an embodiment of the present disclosure provides a sight tracking device, comprising: a first determining unit, for determining an observation region where an iris center of a to-be-tested iris image is located according to a target model, the target model being a module obtained according to a target parameter and an Extreme Learning Machine neural network, the target parameter being a parameter obtained after n visual feature parameters are input to the Extreme Learning Machine neural network, each of the n visual feature parameters being an visual feature parameter of each iris image in n iris images corresponding to a same vision region in a preset reference image, the preset reference image being divided into at least two vision regions with an equal area, and n being an integer greater than 1; a processing unit, for modifying a prediction region by using the observation region, to obtain a target region, the prediction region being a region where the iris center of the to-be-tested iris image is located determined by a kalman filtering method; a second determining unit, for determining a position of fixation point of human eyes on a screen according to the target region.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 1-2 is a schematic diagram of an implementation environment involved in an embodiment of the present disclosure;

FIG. 1-3 is a flow chart of a sight tracking method provided by an embodiment of the present disclosure;

FIG. 2-1 is a flow chart of another sight tracking method provided by an embodiment of the present disclosure;

FIG. 2-2 is a schematic diagram of a vision region divided in a preset reference image provided by an embodiment of the present disclosure;

FIG. 2-3 is a structural schematic diagram of an ELM neural network;

FIG. 2-4 is a flow chart of determining a target parameter of the ELM neural network provided by an embodiment of the present disclosure;

FIG. 2-5 is a flow chart of determining an observation region where an iris center of a to-be-tested iris image is located provided by an embodiment of the present disclosure;

FIG. 2-6 is a flow chart of modifying a prediction region to obtain a target region provided by an embodiment of the present disclosure;

FIG. 2-7 is a flow chart of determining a position of fixation point of human eyes on a screen provided by an embodiment of the present disclosure;

FIG. 3 is a structural schematic diagram of a sight tracking device provided by an embodiment of the present disclosure;

FIG. 4-1 is a structural schematic diagram of another sight tracking device provided by an embodiment of the present disclosure;

FIG. 4-2 is a structural schematic diagram of a first determining unit provided by an embodiment of the present disclosure;

FIG. 4-3 is a structural schematic diagram of a processing unit provided by an embodiment of the present disclosure;

FIG. 4-4 is a structural schematic diagram of a second determining unit provided by an embodiment of the present disclosure;

FIG. 4-5 is a structural schematic diagram of a third determining unit provided by an embodiment of the present disclosure; and FIG. 4-6 is a structural schematic diagram of a fourth determining unit provided by an embodiment of the present disclosure.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In order to clarify the objects, technical solutions and advantages of the present disclosure, the embodiments of the present disclosure will be further described in detail in combination with the drawings.

Figure 1:
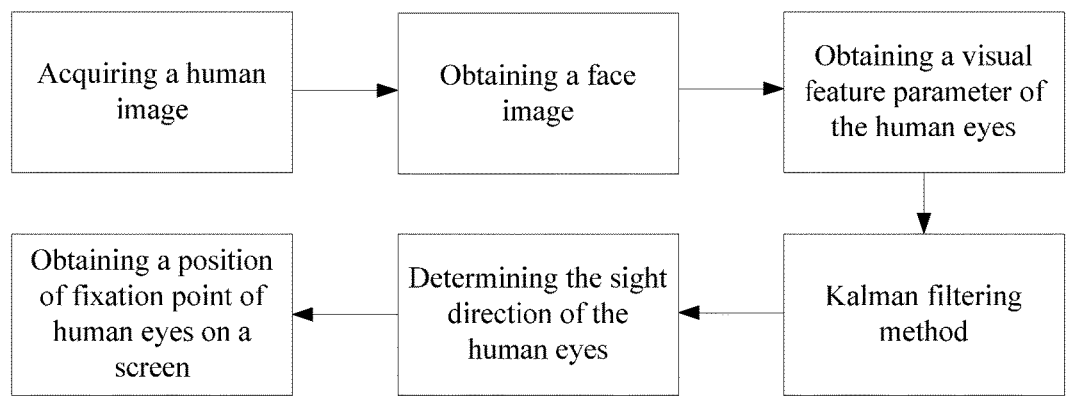
FIG. 1-1 is a schematic diagram of a sight tracking method in a related art.

FIG. 1-1 shows a schematic diagram of a sight tracking method in a related art; as shown in FIG. 1-1, in the method, firstly, a human image is acquired by a camera; then the human image is processed to obtain a face image; next, by using symmetry of a head profile, a range of the face image is reduced, to detect a potential region of the human eyes, and obtain a visual feature parameter of the human eyes. Then sight tracking is performed by using the kalman filtering method, to determine the sight direction of the human eyes, and obtain a position of fixation point of human eyes on a screen, wherein the visual feature parameter is mainly some optical characteristics depending on structures of the human eyes, and the structures of the human eyes may be a corneal periphery and a scleral part, a black pupil, a white sclera, an elliptical iris and the like.

Figures 1, 2:
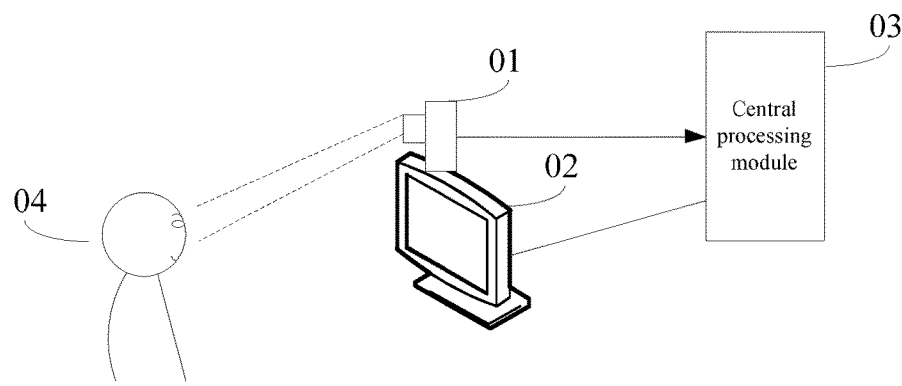

FIG. 1-2 shows a schematic diagram of an implementation environment involved in an embodiment of the present disclosure; and the implementation environment may include: a camera 01, a television 02, a central processing module 03 and a user 04.

The user 04 gazes at a screen of the television 02, the camera 01 obtains a face image of the user 04, and sends the face image to the central processing module 03 within the television 02, the central processing module 03 processes the face image, obtains the visual feature parameter, determines the position of fixation point of human eyes on a screen according to the visual feature parameter, and completes a sight tracking process.

Figures 1, 2, 3:
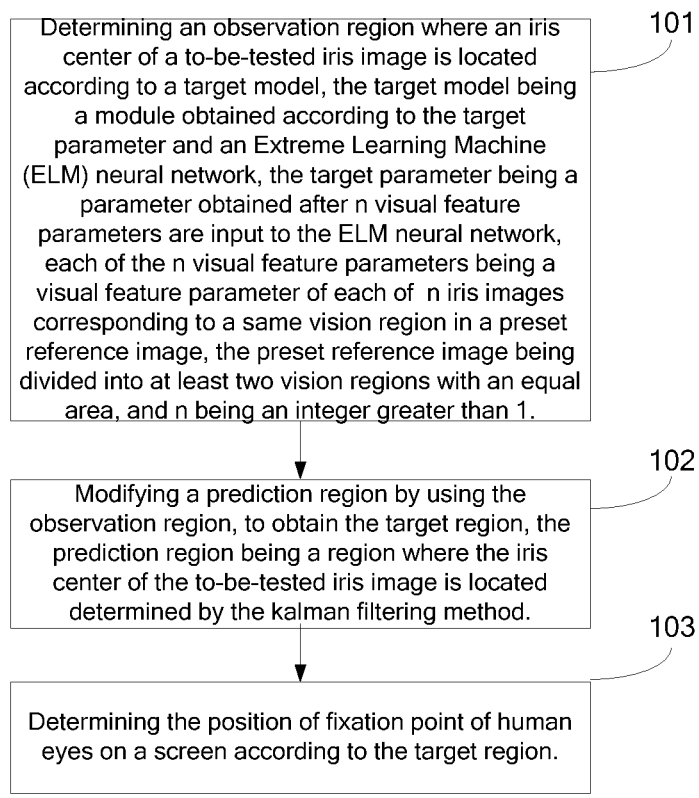

An embodiment of the present disclosure provides a sight tracking method, as shown in FIG. 1-3, the method comprising:

Step 101: determining an observation region where an iris center of a to-be-tested iris image is located according to a target model, the target model being a module obtained according to a target parameter and an Extreme Learning Machine (ELM) neural network, the target parameter being a parameter obtained after n visual feature parameters are input to the ELM neural network, each of the n visual feature parameters being a visual feature parameter of each of n iris images corresponding to the same vision region in a preset reference image, the preset reference image being divided into at least two vision regions with an equal area, and n being an integer greater than 1.

Step 102: modifying a prediction region by using the observation region, to obtain a target region, the prediction region being a region where the iris center of the to-be-tested iris image is located determined by a kalman filtering method.

Step 103: determining a position of fixation point of human eyes on a screen according to the target region.

In summary, the sight tracking method provided by the embodiment of the present disclosure, can obtain the target model according to the target parameter and the ELM neural network, determine the observation region where the iris center of the to-be-tested iris image is located, then modify the prediction region obtained by the kalman filtering method by using the observation region, to obtain the target region, and finally determine the position of fixation point of human eyes on a screen according to the target region, which, as compared with the related art, has a higher accuracy of the observation region for modifying the prediction region, and thus, improves precision and speed of determining the position of fixation point of human eyes on a screen.

Optionally, prior to step 101, the method further comprises: obtaining the visual feature parameter of each of n iris images corresponding to the same vision region in the preset reference image, to obtain n visual feature parameters; determining the target parameter of the ELM neural network, by inputting the n visual feature parameters to the ELM neural network; and determining the target model according to the target parameter and the ELM neural network.

Therein, the target parameter is an output weight of the ELM neural network. The determining the target parameter of the ELM neural network, by inputting the n visual feature parameters to the ELM neural network, includes:

Taking the n visual feature parameters as an input parameter of the ELM neural network;

Taking a coordinate matrix corresponding to the same vision region as an output parameter of the ELM neural network;

Determining the output weight of the ELM neural network, according to the input parameter, the output parameter, an input weight of the ELM neural network and a threshold value, the input weight being a weight from an input node of the ELM neural network to a hidden layer node, and the threshold value being a threshold of the hidden layer node;

Accordingly, the determining the target model according to the target parameter and the ELM neural network, includes: determining the target model according to the input weight, the threshold value and the output weight of the ELM neural network.

Step 102 includes: detecting a distance between a center of the observation region and a center of the prediction region; determining a value of an adjustment factor according to the distance, the value of the adjustment factor being positively correlated to the distance; modifying the prediction region by adjusting a kalman gain equation according to the observation region, to obtain the target region. The kalman gain equation is:

$$K_k = P_{k,k-1} H_k^T (H_k P_{k,k-1} H_k^T + r_k R_k);$$

Where, $K_k$ is a filter gain matrix at current moment, $P_{k,k-1}$ is a one-step error prediction variance matrix from previous moment to the current moment, $H_k$ is an observation matrix corresponding to the observation region at the current moment, $H_k^T$ is a transposed matrix of the observation matrix at the current moment, T represents a transposed symbol of the matrix, for example, $A^T$ represents a transposed matrix of a matrix A, $R_k$ is a process error covariance matrix at the current moment, $r_k$ is an adjustment factor at the current moment, k is the current moment, and k−1 is the previous moment.

Step 101 includes: acquiring a to-be-tested face image; obtaining an iris image corresponding to the to-be-tested face image; obtaining a target visual feature parameter according to the iris image corresponding to the to-be-tested face image; inputting the target visual feature parameter to the target model, to obtain a parameter output by the target model; and taking the parameter output by the target model as the observation region where the iris center of the to-be-tested iris image is located.

Further, prior to the obtaining the visual feature parameter of each of n iris images corresponding to the same vision region in the preset reference image, to obtain n visual feature parameters, the method further comprises: acquiring n face images; obtaining the iris image corresponding to each face image, to obtain the n iris images.

Step 103 includes: determining a target sight direction according to the target region; and determining the position of fixation point of human eyes on a screen, according to the target sight direction and a preset coordinate system, the coordinate system being used for recording a positional relationship between the human eyes and the position of fixation point on the screen.

Optionally, the iris is of an elliptical shape, the visual feature parameter is any feature parameter among position coordinates of the iris in the iris image, an included angle between a major axis of the iris and a horizontal direction, a length of the major axis of the iris and a length of a minor axis of the iris.

In summary, the sight tracking method provided by the embodiment of the present disclosure, can obtain the target model according to the target parameter and the ELM neural network, determine the observation region where the iris center of the to-be-tested iris image is located, then modify the prediction region obtained by the kalman filtering method by using the observation region, to obtain the target region, and finally determine the position of fixation point of human eyes on a screen according to the target region, which, as compared with the related art, has a higher accuracy of the observation region for modifying the prediction region, and thus, improves precision and speed of determining the position of fixation point of human eyes on a screen.

An embodiment of the present disclosure provides another sight tracking method, as shown in FIG. 2-1, the method comprising:

Step 201: acquiring n face images.

Exemplarily, the n face images may be acquired by a camera.

Step 202: obtaining an iris image corresponding to each face image, to obtain n iris images.

By using symmetry of a head profile, a range of the face image is reduced, to detect a potential region of the human eyes, for example, the iris of an elliptical shape, obtain the iris image corresponding to each face image, to obtain the n iris images. The iris is positioned in a middle layer of an eyeball, which is located in a front-most portion of a vascular membrane, in front of a ciliary body, and plays a role in automatically adjusting a size of a pupil, and adjusting an amount of light entering into the eyes. In the embodiment of the present disclosure, a feature parameter of the iris is taken as a visual feature parameter for tracking sight.

Step 203: obtaining the visual feature parameter of each of n iris images corresponding to the same vision region in the preset reference image, to obtain n visual feature parameters.

The iris is of an elliptical shape, the visual feature parameter is any feature parameter among position coordinates of the iris in the iris image, an included angle between a major axis of the iris and a horizontal direction, a length of the major axis of the iris and a length of a minor axis of the iris.

The preset reference image may be divided into at least two vision regions with an equal area. Exemplarily, the preset reference image may be of an elliptical shape, and may also be of other shapes. When the preset reference image is of the elliptical shape, the preset reference image is divided into a plurality of vision regions according to an image profile; the more the divided vision regions, the more the vision regions with an equal area included. FIG. 2-2 shows a schematic diagram of a vision region divided in a preset reference image; as shown in FIG. 2-2, the preset reference image is divided into 9 vision regions, reference signs of the 9 vision regions are 1 to 9, wherein, vision regions with reference signs of 1, 7, 3 and 9 have an equal area, and vision regions with reference signs of 2, 8, 4 and 6 have an equal area. Exemplarily, the preset reference image may also be divided into 16 vision regions; the more the divided vision regions, the more accurate the position of fixation point of human eyes on a screen determined.

Exemplarily, the visual feature parameter of each iris image of n iris images corresponding to a vision region 1 in FIG. 2-2 may be obtained, to obtain n visual feature parameters; the visual feature parameter of each iris image of n iris images corresponding to a vision region 2 in FIG. 2-2 may be obtained, to obtain n visual feature parameters; and the visual feature parameter of each iris image of n iris images corresponding to a vision region 4 in FIG. 2-2 may be obtained, to obtain n visual feature parameters.

Step 204: determining the target parameter of the ELM neural network, by inputting the n visual feature parameters to the ELM neural network.

The target parameter is an output weight of the ELM neural network. From a perspective of a structure of the neural network, the ELM is a simple feed-forward neural network of a single hidden layer. An input weight from an input node of the ELM neural network to the hidden layer node, and a threshold value of the hidden layer node are randomly selected.

FIG. 2-3 shows a structural schematic diagram of an ELM neural network; as shown in FIG. 2-3, the ELM neural network includes three layers: an input layer, a hidden layer and an output layer. Therein, the input layer includes n inputs, the hidden layer includes N hidden layer nodes, and the output layer includes m outputs. The ELM neural network is formed by interconnecting N hidden layer nodes according to a certain rule, and performs information processing, by a dynamic process of interaction of the hidden layer nodes; and each hidden layer node is provided with an adder Σ and an activation function g(x), exemplarily, $$g(x) = \frac{1}{1+e^{-x}}.$$

The hidden layer node is connected with the input node and the output node by weights. In practical application, a purpose of processing information is achieved by adjusting connection weights corresponding to the ELM neural network.

It is assumed that there are M arbitrary and mutually independent samples $(x_i, t_i)$, where, $x_i \in R_n$, $t_i \in R_m$, and a data model of a standard feed-forward neural network of a single hidden layer having N hidden layer nodes and an activation function g(x) is:

$$\sum_{i=1}^{N} \beta_i g(x_j) = \sum_{i=1}^{N} \beta_i g(w_i \cdot x_j + b_i), j=1, \ldots, M,$$

Where, $w_i = [w_{i_1}, w_{i_2}, \ldots, w_{i_n}]^T$ is a weight vector connecting an ith layer input node and the hidden layer node, $\beta_i = [\beta_{i_1}, \beta_{i_2}, \ldots, \beta_{i_n}]T$ is a weight vector connecting an ith hidden layer node and the output node, $b_i$ is a threshold value of an ith layer hidden layer node, $w_i \cdot x_j$ indicates an inner product of $w_i$ and $x_j$, and the output node of the ELM neural network is a linear node. By inputting the n visual feature parameters to the ELM neural network shown in FIG. 2-3, the output weight of the ELM neural network is determined.

Figures 1, 2:
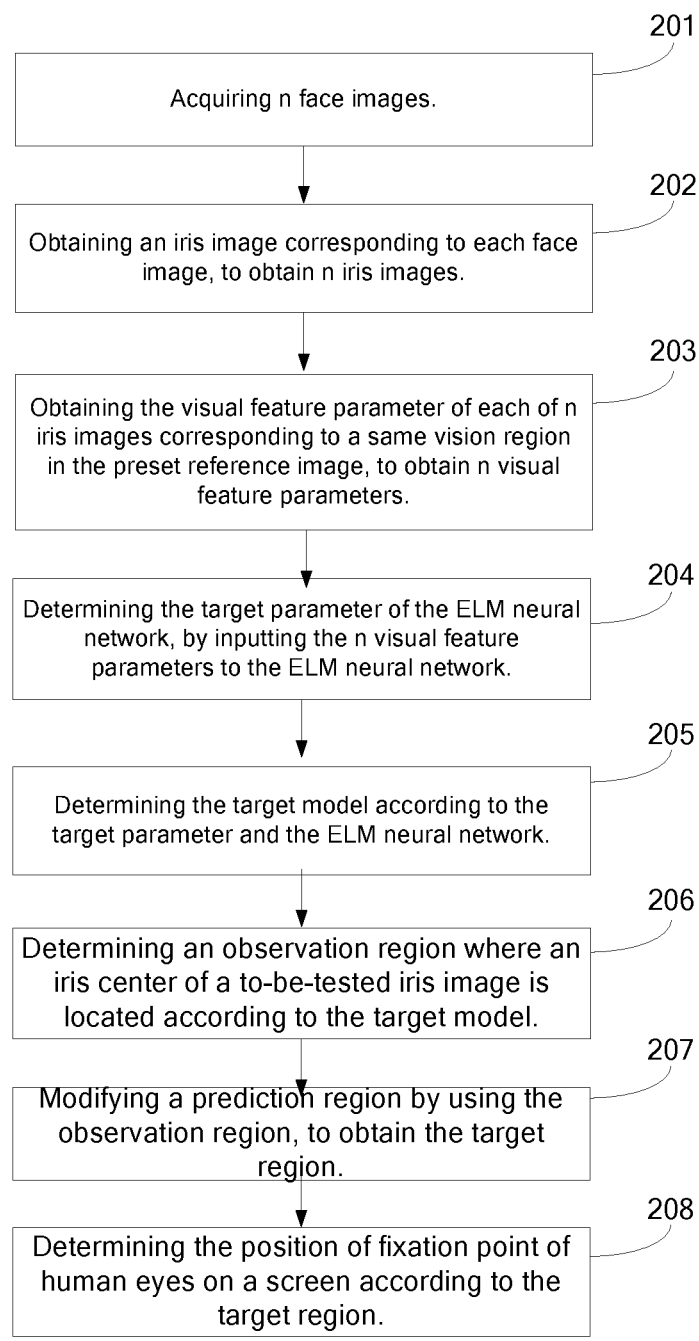
Figure 2:
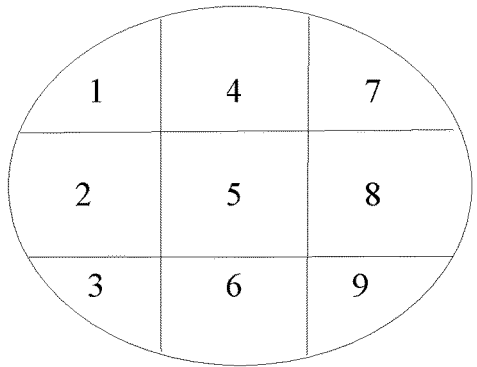
Figures 2, 3:
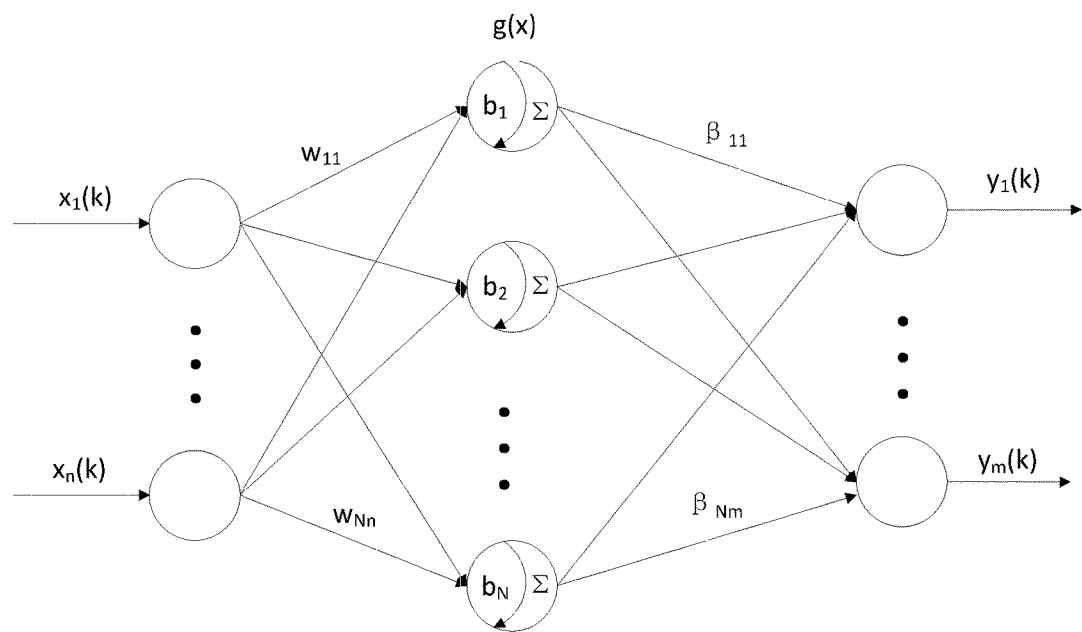
Figures 2, 3, 4:
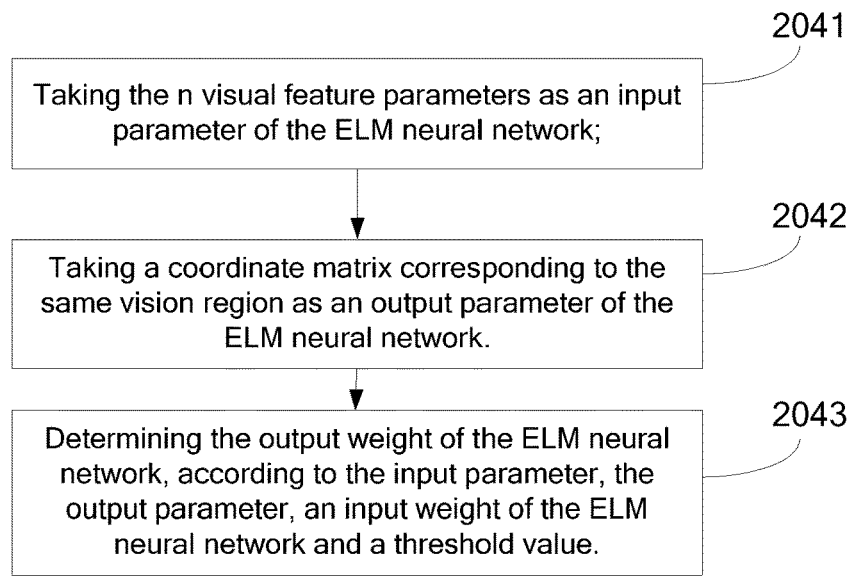

Exemplarily, step 204 as shown in FIG. 2-4, includes:

Step 2041: taking the n visual feature parameters as an input parameter of the ELM neural network.

It is illustrated with the ELM neural network shown in FIG. 2-3 as an example, and the n visual feature parameters are taken as the input parameter of the ELM neural network.

Step 2042: taking a coordinate matrix corresponding to the same vision region as an output parameter of the ELM neural network.

The coordinate matrix corresponding to the same vision region in FIG. 2-2 is taken as the output parameter of the ELM neural network shown in FIG. 2-3.

Step 2043: determining the output weight of the ELM neural network, according to the input parameter, the output parameter, an input weight of the ELM neural network and a threshold value.

Since the input weight of the ELM neural network and the threshold value of the hidden layer node are randomly selected, the ELM neural network may be trained according to the input parameter, and the output parameter, to obtain the output weight of the ELM neural network. At the end of training, respective weights and the threshold value in the ELM neural network are just determined.

Step 205: determining the target model according to the target parameter and the ELM neural network.

After the respective weights and the threshold value in the ELM neural network are determined in step 204, a certain network model, that is, the target model, may be obtained.

Exemplarily, step 205 includes: determining the target model, according to the input weight, the threshold value and the output weight of the ELM neural network.

Step 206: determining an observation region where an iris center of a to-be-tested iris image is located according to the target model.

After the target model is determined, the observation region where the iris center of the to-be-tested iris image is located may be determined according to the target model.

Exemplarily, step 206 as shown in FIG. 2-5, includes:

Step 2061: acquiring a to-be-tested face image.

Any face image is obtained by using the camera.

Step 2062: obtaining an iris image corresponding to the to-be-tested face image.

By an image processing technology, the iris image corresponding to the to-be-tested face image is obtained.

Step 2063: obtaining a target visual feature parameter according to the iris image corresponding to the to-be-tested face image.

By the image processing technology and a mathematical analysis method, the visual feature parameter corresponding to the iris image corresponding to the to-be-tested face image is obtained; and the visual feature parameter may be any feature parameter among position coordinates of the iris in the iris image, an included angle between a major axis of the iris and a horizontal direction, a length of the major axis of the iris and a length of a minor axis of the iris.

Step 2064: inputting the target visual feature parameter to the target model, to obtain a parameter output by the target model.

By inputting the obtained target visual parameter into the trained ELM neural network, the parameter output by the trained ELM neural network may be obtained.

Step 2065: taking the parameter output by the target model as the observation region where the iris center of the to-be-tested iris image is located.

The parameter output by the trained ELM neural network is taken as the observation region where the iris center of the to-be-tested iris image is located, and the observation region is used for modifying the prediction region obtained by the kalman filtering method.

Step 207: modifying a prediction region by using the observation region, to obtain the target region.

The prediction region is a region where the iris center of the to-be-tested iris image is located determined by the kalman filtering method. The state equation for determining the prediction region by the kalman filtering method is a linear equation, an accuracy of the prediction region is lower, an accuracy of the observation region is lower, and it is impossible to better determine the position of fixation point of human eyes on a screen, and thus, it is necessary to modify the prediction region by using the observation region output by the trained ELM neural network, to finally obtain the target region.

Exemplarily, step 207 as shown in FIG. 2-6, includes:

Step 2071: detecting a distance between a center of the observation region and a center of the prediction region.

The prediction region is obtained by the kalman filtering method, the observation region is obtained by the trained ELM neural network, and the distance between the center of the observation region and the center of the prediction region is detected.

Step 2072: determining a value of an adjustment factor according to the distance, the value of the adjustment factor being positively correlated to the distance.

In the kalman filtering method, a prediction value is modified by using an observation value, the modification equation includes kalman gain $K_k$, and an equation for calculating the kalman gain $K_k$ is:

$$K_k = P_{k,k-1} H_k^T (H_k P_{k,k-1} H_k^T + R_k) \quad (1)$$

Where, $K_k$ is a filter gain matrix at current moment, $P_{k,k-1}$ is a one-step error prediction variance matrix from previous moment to the current moment, $H_k$ is an observation matrix corresponding to the observation region at the current moment, $H_k^T$ is a transposed matrix of the observation matrix at the current moment, $R_k$ is a process error covariance matrix at the current moment, k is the current moment, and k−1 is the previous moment.

From equation (1), it can be known that, the prediction region at the current moment obtained by the kalman filtering method is determined by the process error covariance matrix $R_k$ at the current moment, and the process error covariance matrix $R_k$ at the current moment is more unstable, which is apt to cause a sight tracking result unstable, and a distance between a tracking position and an actual position sometimes large and sometimes small, and thus, in the embodiment of the present disclosure, an adjustment factor $r_k$ at the current moment is added to the original process error covariance matrix $R_k$ at the current moment, and by adjusting the value of the adjustment factor $r_k$ at the current moment, it is ensured that the process error covariance matrix $R_k$ at the current moment is a stable matrix, to further improve a sight tracking effect, wherein, the kalman gain equation after one adjustment factor $r_k$ at the current moment is added to the original process error covariance matrix $R_k$ at current moment is:

$$K_k = P_{k,k-1} H_k^T (H_k P_{k,k-1} H_k^T + r_k R_k) \quad (2)$$

Where, $K_k$ is a filter gain matrix at current moment, $P_{k,k-1}$ is a one-step error prediction variance matrix from previous moment to the current moment, $H_k$ is an observation matrix corresponding to the observation region at the current moment, $H_k^T$ is a transposed matrix of the observation matrix at the current moment, T represents a transposed symbol of the matrix, for example, $A^T$ represents a transposed matrix of a matrix A, $R_k$ is a process error covariance matrix at the current moment, $r_k$ is an adjustment factor at the current moment, k is the current moment, and k−1 is the previous moment.

Step 2073: modifying the prediction region by adjusting a kalman gain equation according to the observation region, to obtain the target region.

Specifically, when the distance between the center of the observation region and the center of the prediction region is larger, the adjustment factor $r_k$ at the current moment in the kalman gain equation (2) is assigned a larger value, to rapidly adjust the prediction region; when the distance between the center of the observation region and the center of the prediction region is smaller, the adjustment factor $r_k$ at current moment in the kalman gain equation (2) is assigned a smaller value; and when the distance between the center of the observation region and the center of the prediction region exceeds a certain range, it indicates that by the current kalman filtering method, the sight is not tracked, and then the observation region obtained by the ELM neural network is taken as a final target region. In practical application, 5-10 adjustment factors $r_k$ may be used, and a value range of the adjustment factor $r_k$ may be set according to practical application. Exemplarily, the adjustment factor $r_k \in [110.01, 10]$. Thus, the prediction region determined by the kalman filtering method is modified by the ELM neural network, which improves the sight tracking effect, and at the same time reduces an amount of calculation related to sight tracking, and improves a sight tracking speed.

Step 208: determining the position of fixation point of human eyes on a screen according to the target region.

Exemplarily, step 208 as shown in FIG. 2-7, includes:

Step 2081: determining a target sight direction according to the target region.

The related art may be referred to for a process of determining the target sight direction according to the target region, which will not be repeated here.

Step 2082: determining the position of fixation point of human eyes on a screen, according to the target sight direction and a preset coordinate system.

The coordinate system is used for recording a positional relationship between the human eyes and the position of fixation point on a screen. With the sight direction of human eyes known and according to the coordinate system, the position of fixation point of human eyes on a screen may be obtained, to further complete an interaction process between a human and a television, for example, to achieve a purpose of remote control of the television by the human, which enhances user experience.

It should be noted that an order of the steps of the sight tracking method provided in the embodiments of the present disclosure may be properly regulated, the steps may be correspondingly increased or reduced according to situations, changed methods easily conceived by any skilled in the art in the technical scope disclosed in the present disclosure should fall within the protection scope of the present disclosure and are not repeated herein.

In summary, the sight tracking method provided by the embodiment of the present disclosure, can obtain the target model according to the target parameter and the ELM neural network, determine the observation region where the iris center of the to-be-tested iris image is located, then modify the prediction region obtained by the kalman filtering method by using the observation region, to obtain the target region, and finally determine the position of fixation point of human eyes on a screen according to the target region, which, as compared with the related art, has a higher accuracy of the observation region for modifying the prediction region, and thus, improves precision and speed of determining the position of fixation point of human eyes on a screen.

An embodiment of the present disclosure provides a sight tracking device, as shown in FIG. 3, the device comprising:

A first determining unit 301, for determining an observation region where an iris center of a to-be-tested iris image is located according to a target model, the target model being a module obtained according to a target parameter and an Extreme Learning Machine (ELM) neural network, the target parameter being a parameter obtained after n visual feature parameters are input to the ELM neural network, each of the n visual feature parameters being an visual feature parameter of each iris image in n iris images corresponding to the same vision region in a preset reference image, the preset reference image being divided into at least two vision regions with an equal area, and n being an integer greater than 1.

A processing unit 302, for modifying a prediction region by using the observation region, to obtain the target region.

The prediction region is a region where the iris center of the to-be-tested iris is located determined by a kalman filtering method.

A second determining unit 303, for determining a position of fixation point of human eyes on a screen according to the target region.

In summary, the sight tracking device provided by the embodiment of the present disclosure, can obtain the target model according to the target parameter and the ELM neural network, determine the observation region where the iris center of the to-be-tested iris image is located, then modify the prediction region obtained by the kalman filtering method by using the observation region, to obtain the target region, and finally determine the position of fixation point of human eyes on a screen according to the target region, which, as compared with the related art, has a higher accuracy of the observation region for modifying the prediction region, and thus, improves precision and speed of determining the position of fixation point of human eyes on a screen.

An embodiment of the present disclosure provides another sight tracking device, as shown in FIG. 4-1, the device comprising:

A first determining unit 301, for determining an observation region where an iris center of a to-be-tested iris image is located according to a target model, the target model being a module obtained according to a target parameter and an Extreme Learning Machine (ELM) neural network, the target parameter being a parameter obtained after n visual feature parameters are input to the ELM neural network, each of the n visual feature parameters being an visual feature parameter of each iris image in n iris images corresponding to the same vision region in a preset reference image, the preset reference image being divided into at least two vision regions with an equal area, and n being an integer greater than 1.

It should be noted that, the iris is of an elliptical shape. The visual feature parameter is any feature parameter among position coordinates of the iris in the iris image, an included angle between a major axis of the iris and a horizontal direction, a length of the major axis of the iris and a length of a minor axis of the iris.

Specifically, the first determining unit 301 as shown in FIG. 4-2, includes:

A first acquiring module 3011, for acquiring a to-be-tested face image.

A first obtaining module 3012, for obtaining an iris image corresponding to the to-be-tested face image.

A second obtaining module 3013, for obtaining a target visual feature parameter according to the iris image corresponding to the to-be-tested face image.

A third processing module 3014, for inputting the target visual feature parameter to the target model, to obtain a parameter output by the target model.

A fourth processing module 3015, for taking the parameter output by the target model as the observation region where the iris center of the to-be-tested iris image is located.

A processing unit 302, for modifying a prediction region by using the observation region, to obtain the target region. The prediction region is a region where the iris center of the to-be-tested iris image is located determined by the kalman filtering method.

Exemplarily, the processing unit 302 as shown in FIG. 4-3, includes:

A detecting module 3021, for detecting a distance between a center of the observation region and a center of the prediction region.

A third determining module 3022, for determining a value of an adjustment factor according to the distance, the value of the adjustment factor being positively correlated to the distance.

A modifying module 3023, for modifying the prediction region by adjusting a kalman gain equation according to the observation region, to obtain the target region.

The kalman gain equation is:

$$K_k = P_{k,k-1} H_k^T (H_k P_{k,k-1} H_k^T + r_k R_k);$$

Where, $K_k$ is a filter gain matrix at current moment, $P_{k,k-1}$ is a one-step error prediction variance matrix from previous moment to the current moment, $H_k$ is an observation matrix corresponding to the observation region at the current moment, $H_k^T$ is a transposed matrix of the observation matrix at the current moment, T represents a transposed symbol of the matrix, for example, $A^T$ represents a transposed matrix of a matrix A, $R_k$ is a process error covariance matrix at the current moment, $r_k$ is an adjustment factor at the current moment, k is the current moment, and k−1 is the previous moment.

A second determining unit 303, for determining the position of fixation point of human eyes on a screen according to the target region.

Specifically, the second determining unit 303 as shown in FIG. 4-4, includes:

A fourth determining module 3031, for determining a target sight direction according to the target region.

A fifth determining module 3032, for determining the position of fixation point of human eyes on a screen, according to the target sight direction and a preset coordinate system. The coordinate system is used for recording a positional relationship between the human eyes and the position of fixation point on a screen.

A first obtaining unit 304, for obtaining the visual feature parameter of each iris image in n iris images corresponding to the same vision region in the preset reference image, to obtain n visual feature parameters.

A third determining unit 305, for determining the target parameter of the ELM neural network, by inputting the n visual feature parameters to the ELM neural network.

The target parameter is an output weight of the ELM neural network.

Figures 2, 3, 4, 5:
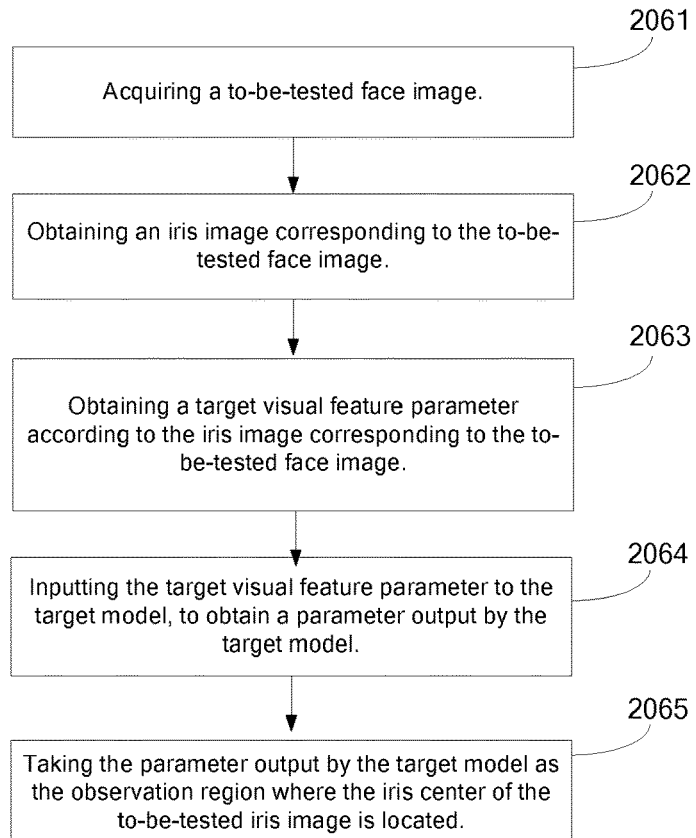

Exemplarily, the third determining unit 305 as shown in FIG. 4-5, includes:

A first processing module 3051, for taking the n visual feature parameters as an input parameter of the ELM neural network.

A second processing module 3052, for taking a coordinate matrix corresponding to the same vision region as an output parameter of the ELM neural network.

A first determining module 3053, for determining the output weight of the ELM neural network, according to the input parameter, the output parameter, an input weight of the ELM neural network and a threshold value. The input weight is a weight from an input node of the ELM neural network to a hidden layer node, and the threshold value is a threshold value of the hidden layer node.

A fourth determining unit 306, for determining the target model according to the target parameter and the ELM neural network.

Figures 2, 3, 4, 5, 6:
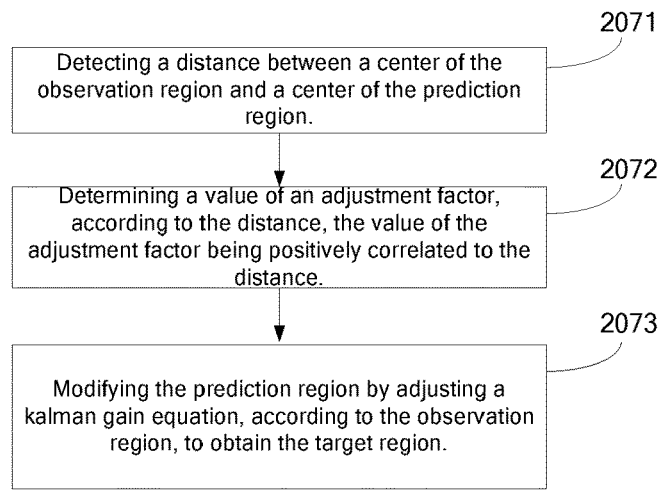
Figures 2, 3, 4, 5, 6, 7:
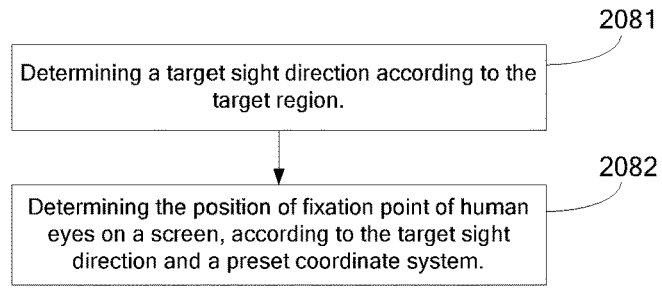
Figure 3:
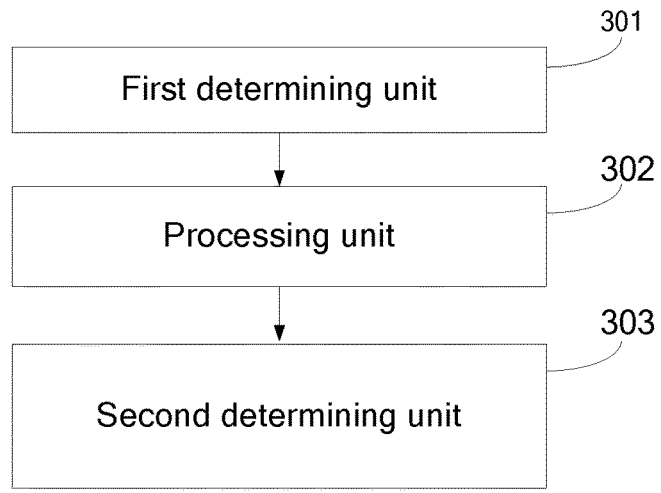
Figures 1, 4:
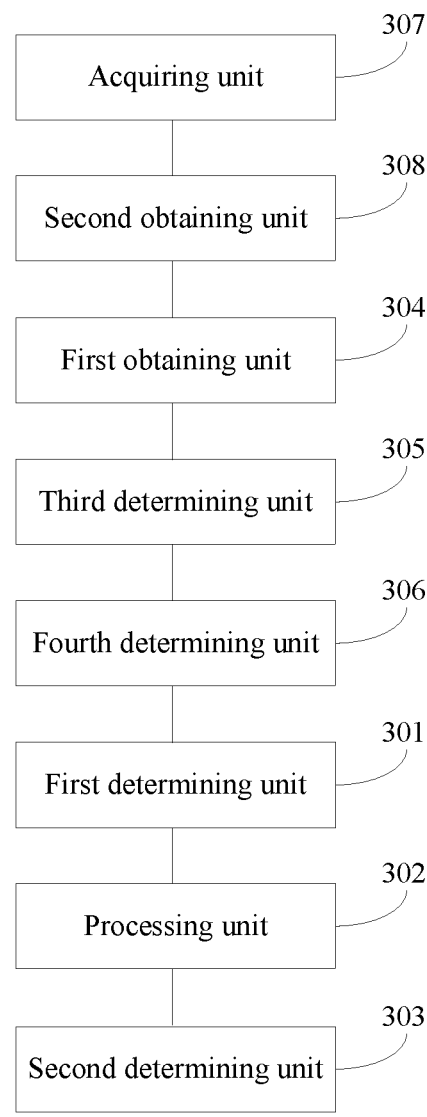
Figures 2, 4:
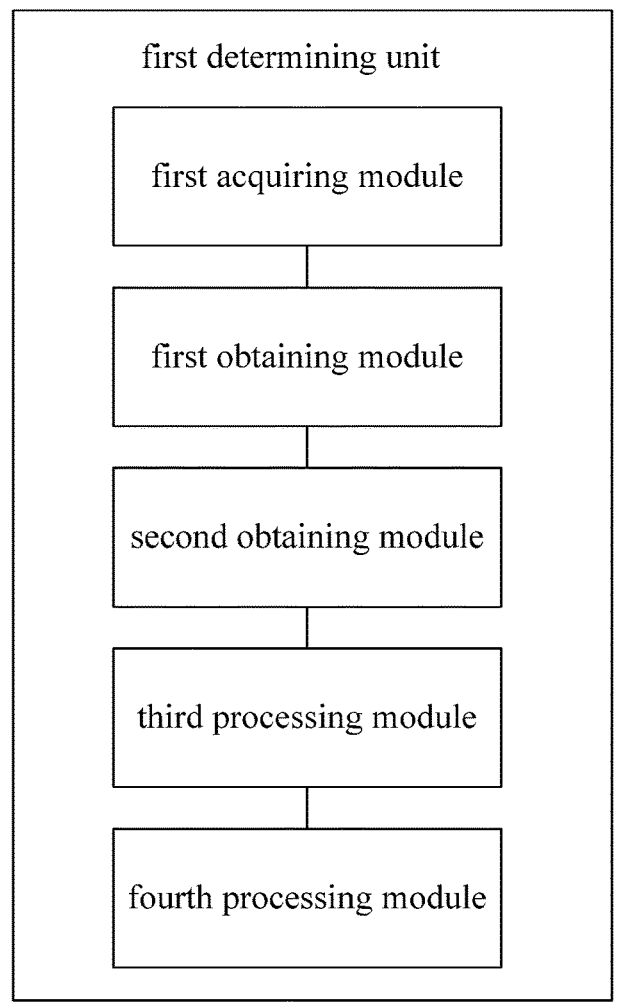
Figures 3, 4:
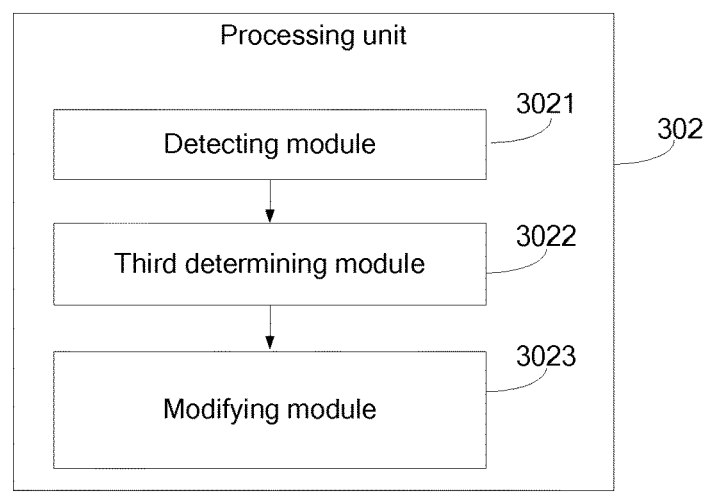
Figure 4:
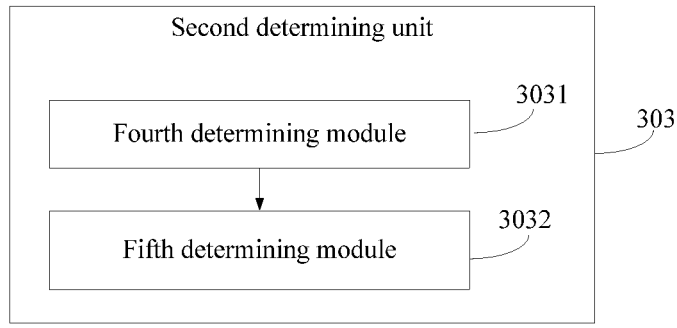
Figures 4, 5:
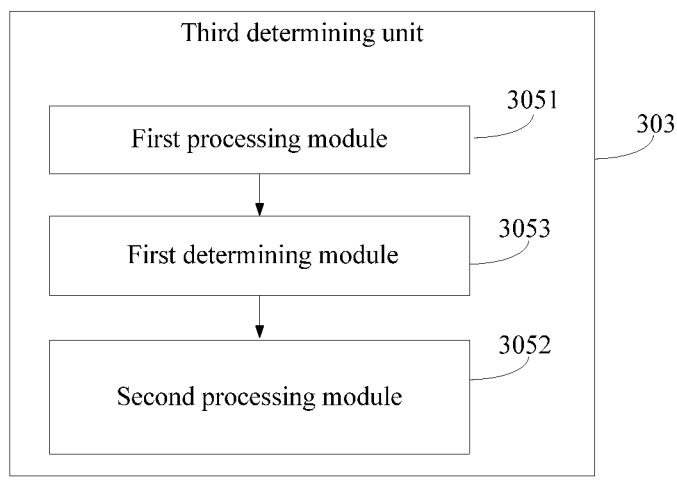
Figures 4, 5, 6:
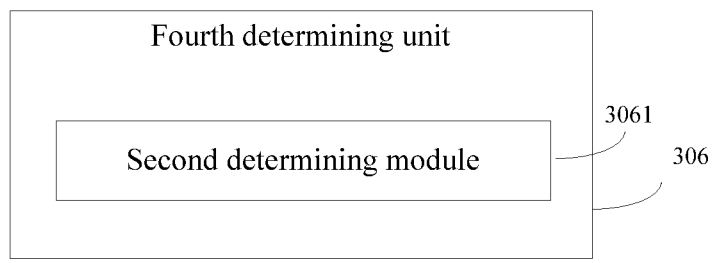

Exemplarily, the fourth determining unit 306 as shown in FIG. 4-6, includes:

A second determining module 3061, for determining the target model, according to the input weight, the threshold value and the output weight of the ELM neural network.

An acquiring unit 307, for acquiring n face images.

A second obtaining unit 308, for obtaining an iris image corresponding to each face image, to obtain n iris images.

In summary, the sight tracking device provided by the embodiment of the present disclosure, can obtain the target model according to the target parameter and the ELM neural network, determine the observation region where the iris center of the to-be-tested iris image is located, then modify the prediction region obtained by the kalman filtering method by using the observation region, to obtain the target region, and finally determine the position of fixation point of human eyes on a screen according to the target region, which, as compared with the related art, has a higher accuracy of the observation region for modifying the prediction region, and thus, improves precision and speed of determining the position of fixation point of human eyes on a screen.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

Those skilled in the art can clearly understand that, for convenience and conciseness of description, specific working processes of devices, units and modules described above, can refer to corresponding processes in the embodiments of the foregoing methods, which will not be repeated here.

The application claims priority of Chinese Patent Application No. 201510458572.9 filed on Jul. 30, 2015, the disclosure of which is incorporated herein by reference in its entirety as part of the present application.

The invention claimed is:

1. A sight tracking method, comprising:
  determining an observation region where an iris center of an iris image is located according to a target model;
  modifying a prediction region by using the observation region, to obtain a target region, the prediction region being a region where the iris center of the iris image is located determined by a kalman filtering method; and
  determining a position of fixation point of human eyes on a screen according to the target region,
  wherein before the determining the observation region where the iris center of the iris image is located according to the target model, the method further comprises:
  obtaining a visual feature parameter of each iris image in n iris images corresponding to a same vision region in a preset reference image, to obtain n visual feature parameters;
  determining a target parameter of an Extreme Learning Machine neural network, by inputting the n visual feature parameters to the Extreme Learning Machine neural network;
  determining the target model according to the target parameter and the Extreme Learning Machine neural network,
  the target model being a module obtained according to the target parameter and the Extreme Learning Machine neural network, the target parameter being a parameter obtained after the n visual feature parameters are input to the Extreme Learning Machine neural network, each of the n visual feature parameters being the visual feature parameter of each iris image in n iris images corresponding to the same vision region in a preset reference image, the preset reference image being divided into at least two vision regions with an equal area, and n being an integer greater than 1,
  wherein the target parameter is an output weight of the Extreme Learning Machine neural network,
  the determining the target parameter of the Extreme Learning Machine neural network, by inputting the n visual feature parameters to the Extreme Learning Machine neural network, includes:
  taking the n visual feature parameters as an input parameter of the Extreme Learning Machine neural network;
  taking a coordinate matrix corresponding to the same vision region as an output parameter of the Extreme Learning Machine neural network;
  determining the output weight of the Extreme Learning Machine neural network, according to the input parameter, the output parameter, an input weight of the Extreme Learning Machine neural network and a threshold value, the input weight being a weight from an input node to a hidden layer node of the Extreme Learning Machine neural network, and the threshold value being a threshold value of the hidden layer node;
  the determining the target model according to the target parameter and the Extreme Learning Machine neural network, includes:
  determining the target model according to the input weight, the threshold value and the output weight of the Extreme Learning Machine neural network.

2. The method according to claim 1, wherein, the modifying the prediction region by using the observation region, to obtain the target region, includes:
  detecting a distance between a center of the observation region and a center of the prediction region;
  determining a value of an adjustment factor according to the distance, the value of the adjustment factor being positively correlated to the distance;
  modifying the prediction region by adjusting a kalman gain equation according to the observation region, to obtain the target region, the kalman gain equation being:

$$K_k = P_{k,k-1} H_k^T (H_k P_{k,k-1} H_k^T + r_k R_k);$$

where, $K_k$ is a filter gain matrix at current moment, $P_{k,k-1}$ is a one-step error prediction variance matrix from previous moment to the current moment, $H_k$ is an observation matrix corresponding to the observation region at the current moment, $H_k^T$ is a transposed matrix of the observation matrix at the current moment, $R_k$ is a process error covariance matrix at the current moment, $r_k$ is an adjustment factor at the current moment, k is the current moment, and k−1 is the previous moment.

3. The method according to claim 1, wherein the determining the observation region where the iris center of the iris image is located according to the target model, includes:
  acquiring a to-be-tested face image;
  obtaining an iris image corresponding to the to-be-tested face image;
  obtaining a target visual feature parameter according to the iris image corresponding to the to-be-tested face image;
  inputting the target visual feature parameter to the target model, to obtain a parameter output by the target model;
  taking the parameter output by the target model as the observation region where the iris center of the iris image is located.

4. The method according to claim 1, wherein, before obtaining the visual feature parameter of each iris image in the n iris images corresponding to the same vision region in the preset reference image, to obtain the n visual feature parameters, the method further comprises:

acquiring n face images;

obtaining the iris image corresponding to each face image, to obtain the n iris images.

5. The method according to claim 1, wherein, the determining the position of the fixation point of human eyes on the screen according to the target region, includes:

determining a target sight direction according to the target region;

determining the position of the fixation point of human eyes on the screen according to the target sight direction and a preset coordinate system, the coordinate system being used for recording a positional relationship between the human eyes and the position of the fixation point on the screen.

6. The method according to claim 1, wherein, the iris is of an elliptical shape, the visual feature parameter is one of a position coordinate of the iris in the iris image, an included angle between a major axis of the iris and a horizontal direction, a length of the major axis of the iris and a length of a minor axis of the iris.

7. A sight tracking device, comprising:

a first determining unit, for determining an observation region where an iris center of an iris image is located according to a target model, the target model being a module obtained according to a target parameter and an Extreme Learning Machine neural network, the target parameter being a parameter obtained after n visual feature parameters are input to the Extreme Learning Machine neural network, each of the n visual feature parameters being a visual feature parameter of each iris image in n iris images corresponding to a same vision region in a preset reference image, the preset reference image being divided into at least two vision regions with an equal area, and n being an integer greater than 1;

a processing unit, for modifying a prediction region by using the observation region, to obtain a target region, the prediction region being a region where the iris center of the iris image is located determined by a kalman filtering method;

a second determining unit, for determining a position of fixation point of human eyes on a screen according to the target region;

a first obtaining unit, for obtaining the visual feature parameter of each iris image in the n iris images corresponding to the same vision region in the preset reference image, to obtain the n visual feature parameters;

a third determining unit, for determining the target parameter of the Extreme Learning Machine neural network, by inputting the n visual feature parameters to the Extreme Learning Machine neural network; and a fourth determining unit, for determining the target model according to the target parameter and the Extreme Learning Machine neural network.

8. The device according to claim 7, wherein, the target parameter is an output weight of the Extreme Learning Machine neural network, the third determining unit, includes:

a first processing module, for taking the n visual feature parameters as an input parameter of the Extreme Learning Machine neural network;

a second processing module, for taking a coordinate matrix corresponding to the same vision region as an output parameter of the Extreme Learning Machine neural network;

a first determining module, for determining the output weight of the Extreme Learning Machine neural network according to the input parameter, the output parameter, an input weight of the Extreme Learning Machine neural network and a threshold value, the input weight being a weight from an input node of the Extreme Learning Machine neural network to a hidden layer node, and the threshold value being a threshold value of the hidden layer node;

the fourth determining unit, includes:

a second determining module, for determining the target model according to the input weight, the threshold value and the output weight of the Extreme Learning Machine neural network.

9. The device according to claim 7, wherein the processing unit includes:

a detecting module, for detecting a distance between a center of the observation region and a center of the prediction region;

a third determining module, for determining a value of an adjustment factor according to the distance, the value of the adjustment factor being positively correlated to the distance;

a modifying module, for modifying the prediction region by adjusting a kalman gain equation according to the observation region, to obtain the target region, the kalman gain equation being:

$$K_k = P_{k,k-1} H_k^T (H_k P_{k,k-1} H_k^T + r_k R_k);$$

where, $K_k$ is a filter gain matrix at current moment, $P_{k,k-1}$ is a one-step error prediction variance matrix from previous moment to the current moment, $H_k$ is an observation matrix corresponding to the observation region at the current moment, $H_k^T$ is a transposed matrix of the observation matrix at the current moment, $R_k$ is a process error covariance matrix at the current moment, $r_k$ is an adjustment factor at the current moment, k is the current moment, and k−1 is the previous moment.

10. The device according to claim 7, wherein the first determining unit, includes:

a first acquiring module, for acquiring a to-be-tested face image;

a first obtaining module, for obtaining an iris image corresponding to the to-be-tested face image;

a second obtaining module, for obtaining a target visual feature parameter according to the iris image corresponding to the to-be-tested face image;

a third processing module, for inputting the target visual feature parameter to the target model, to obtain a parameter output by the target model;

a fourth processing module, for taking the parameter output by the target model as the observation region where the iris center of the iris image is located.

11. The device according to claim 7, wherein the device further comprises:

an acquiring unit, for acquiring n face images;

a second obtaining unit, for obtaining an iris image corresponding to each face image, to obtain the n iris images.

12. The device according to claim 7, wherein the second determining unit, includes:
- a fourth determining module, for determining a target sight direction according to the target region;
- a fifth determining module, for determining a position of fixation point of human eyes on a screen, according to the target sight direction and a preset coordinate system, the coordinate system being used for recording a positional relationship between the human eyes and the position of fixation point on the screen.

13. The device according to claim 7, wherein the iris is of an elliptical shape, the visual feature parameter is one of a position coordinate of the iris in the iris image, an included angle between a major axis of the iris and a horizontal direction, a length of the major axis of the iris and a length of a minor axis of the iris.

* * * * *